(12) United States Patent
Kim (10) Patent No.: US 9,954,256 B2
(45) Date of Patent: Apr. 24, 2018

(54) METHOD FOR WELDING BATTERY MODULE AND WELDED STRUCTURE

(71) Applicant: SK Innovation Co., Ltd., Seoul (KR)

(72) Inventor: Wook Hyun Kim, Seonsan-si (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 15/353,276

(22) Filed: Nov. 16, 2016

(65) Prior Publication Data

US 2017/0062882 A1 Mar. 2, 2017

Related U.S. Application Data

(63) Continuation of application No. 14/409,365, filed as application No. PCT/KR2013/005428 on Jun. 20, 2013, now Pat. No. 9,583,797.

(30) Foreign Application Priority Data

Jun. 20, 2012 (KR) ........................ 10-2012-0066041

(51) Int. Cl.
| | |
|---|---|
| *H01M 10/48* | (2006.01) |
| *B23K 26/20* | (2014.01) |
| *B23K 31/02* | (2006.01) |
| *H01M 2/10* | (2006.01) |
| *H01M 2/20* | (2006.01) |
| *B23K 33/00* | (2006.01) |
| *B23K 26/24* | (2014.01) |
| *B23K 26/21* | (2014.01) |

(Continued)

(52) U.S. Cl.
CPC ........... *H01M 10/482* (2013.01); *B23K 26/20* (2013.01); *B23K 26/21* (2015.10); *B23K 26/24* (2013.01); *B23K 31/02* (2013.01); *B23K 33/00* (2013.01); *H01M 2/1077* (2013.01); *H01M 2/206* (2013.01); *B23K 2201/006* (2013.01); *B23K 2201/38* (2013.01); *H01M 2220/20* (2013.01)

(58) Field of Classification Search
None
See application file for complete search history.

(56) References Cited

U.S. PATENT DOCUMENTS

| | | |
|---|---|---|
| 2006/0170394 A1 | 8/2006 | Ha et al. |
| 2008/0070102 A1 | 3/2008 | Watanabe et al. |

(Continued)

FOREIGN PATENT DOCUMENTS

| | | |
|---|---|---|
| JP | 2008186725 A | 8/2008 |
| KR | 100760754 B1 | 9/2007 |

(Continued)

*Primary Examiner* — Miriam Stagg
*Assistant Examiner* — Victoria H Lynch
(74) *Attorney, Agent, or Firm* — The Webb Law Firm (57) ABSTRACT

Provided are a method for welding a battery module and a welded structure, and more particularly, a method for welding a battery module and a welded structure, in which a plurality of battery cells provided with electrode tabs are assembled to form a module and a voltage measurement portion of a voltage measurement means is welded to the electrode tabs so as to secure stability against vibrations and external shocks, thereby increasing reliability of voltage measurement and the voltage measurement portion is welded to the electrode tabs using the same kind of materials so as to facilitate an operation and improve productivity.

1 Claim, 9 Drawing Sheets

(51) Int. Cl.
 *B23K 101/00* (2006.01)
 *B23K 101/38* (2006.01)

(56) References Cited

U.S. PATENT DOCUMENTS

| | | | |
|---|---|---|---|
| 2009/0323293 A1 | 12/2009 | Koetting et al. | |
| 2010/0009251 A1 | 1/2010 | Shin et al. | |
| 2011/0059342 A1* | 3/2011 | Lee .................... | H01M 2/1077 |
| | | | 429/93 |

FOREIGN PATENT DOCUMENTS

| | | |
|---|---|---|
| KR | 20080036258 A | 4/2008 |
| KR | 20100003143 A | 1/2010 |
| KR | 20120058965 A | 6/2012 |
| KR | 20120140093 A | 12/2012 |
| KR | 20130116562 A | 10/2013 |

* cited by examiner

METHOD FOR WELDING BATTERY MODULE AND WELDED STRUCTURE

CROSS-REFERENCE TO RELATED APPLICATIONS

This application is a continuation of U.S. Ser. No. 14/409,365, filed Dec. 18, 2014, which is the United States national phase of International Application No. PCT/KR2013/005428 filed Jun. 20, 2013, and claims priority to Korean Patent Application No. 10-2012-0066041 filed Jun. 20, 2012, the disclosures of which are hereby incorporated in their entirety by reference.

TECHNICAL FIELD

The present invention relates to a method for welding a battery module, and more particularly, to a method for welding a battery module and a welded structure, in which a voltage measurement portion of a voltage measurement means is welded around electrode tabs of the battery module to secure stability against vibrations and external shock to improve reliability of a voltage measurement value and the voltage measurement potion and the electrode tabs are welded to each other using the same kind of materials is enabled so as to facilitate an operation and improve productivity.

BACKGROUND ART

A vehicle using an internal combustion engine using gasoline or heavy oil as main fuel has a serious effect on pollutions such as air pollution. Therefore, in order to reduce the pollutants, many attempts to develop an electric vehicle or a hybrid electric vehicle have been recently conducted.

Recently, a high output secondary battery using a high energy density non-aqueous electrolyte has been developed. A plurality of high output secondary batteries are connected to each other in series so as to be able to be used in equipment requiring large power for driving a motor such as the electric vehicle, and the like, thereby configuring a large-capacity secondary battery.

As such, a single large-capacity secondary battery is referred to as 'battery cell', and a plurality of battery cells are connected to each other in series or in parallel to form a battery module. After the battery module is completed by forming the plurality of battery cells in the module structure and then additionally assembling a voltage measurement means for measuring voltages of the battery cells and other parts. In this case, the battery cells are provided with electrode tabs to electrically connect the plurality of battery cells, in which the plurality of battery cells are connected by various methods such as clip, compression, welding, and bolting. Further, the voltage measurement means and other parts are additionally assembled around the electrode tabs.

However, the typical battery module may be instable against vibrations and external shocks due to the assembling of the voltage measurement means and other parts and may not implement easy welding due to a difference in materials between the electrode tab and the voltage measurement means. Therefore, the operation of the battery module may not be easy and thus productivity may be reduced.

Therefore, there is a need to develop a method for welding a battery module and a welded structure which may be stable against vibrations and external shocks and may implement an easy operation.

The related art for solving the above problems as described above is disclosed in Korean Patent No. 0760754.

Technical Problem

An object of the present invention is to provide a method for welding a battery module and a welded structure, in which a voltage measurement portion is welded to a battery module so as to be stable against vibrations and external shocks and the voltage measurement portion and the battery module may be welded to each other using the same kind of materials to facilitate a welding operation and improve productivity.

Technical Solution

In one general aspect, there is provided a method for welding a battery module including a plurality of battery cells, each battery having first and second electrode tabs made of different materials, and a voltage measurement means provided with a plurality of voltage measurement portions made of the same material as the first electrode tab, the method including: cutting some portion of the second electrode tab to form a space portion in which the corresponding portion of the first electrode tab is exposed; inserting the voltage measurement portion into the space portion to form a welded surface, which is formed by contacting the exposed first electrode tab and the voltage measurement portion; and welding the second electrode tab with the first electrode tab and the voltage measurement portion with the first electrode tab.

The method may further include: fixing the electrode tab with the voltage measurement portion by a fixing means after the inserting.

In the welding, a laser welding may be performed, and the method may further include: when the laser welding is performed in the welding, after the inserting, changing a shape of the voltage measurement portion to mold the voltage measurement portion in the same shape as the electrode tab which is welded to the voltage measurement portion.

In another general aspect, there is provided a battery module including a plurality of battery cells, wherein each battery cell may have first and second electrode tabs made of different materials, and a voltage measurement means with a plurality of voltage measurement portions made of the same material as the first electrode tab, wherein the first and second electrode tabs are welded at a welded surface that may be formed by contacting each other and the voltage measurement portion may be welded with the first electrode tab exposed in a space portion, which is formed by cutting some portion of the second electrode tab.

Advantageous Effects

According to the method for welding a battery module and the welded structure in accordance with the exemplary embodiments of the present invention configured as described above, the voltage measurement portion is welded around the electrode taps of the battery module to secure the stability against the vibrations and the external shocks, thereby providing the battery module with the improved reliability of the voltage measurement value.

Further, according to the method for welding a battery module and the welded structure according to the exemplary embodiments of the present invention, the voltage measurement portion of the voltage measurement means may be welded to the electrode tabs using the same material as that of the voltage measurement portion by cutting some of the electrode tabs so as to facilitate the operation and improve the reliability of welding, thereby improving the productivity.

In addition, according to the method for welding a battery module and the welded structure according to the exemplary embodiments of the present invention, when the laser welding is performed in the welding process, the welding between the electrode tabs and the welding between the electrode tabs and the voltage measurement portion may not be separately performed but may be simultaneously performed to facilitate the operation and reduce the operation time, thereby obtaining a very economical effect.

BEST MODE

Hereinafter, a technical spirit of the present invention will be described in more detail with reference to the accompanying drawings.

However, the accompanying drawings are only examples shown in order to describe the technical idea of the present invention in more detail. Therefore, the technical idea of the present invention is not limited to shapes of the accompanying drawings.

A battery module 1000 welded by a method for welding a battery module according to an exemplary embodiment of the present invention means that a plurality of batteries are connected to each other, in which the battery module 1000 includes at least two battery cells 100, a plurality of electrode tabs configured to extend from each battery cell 100 so as to be welded to each other, and a voltage measurement means 200 configured to be provided with a plurality of voltage measurement portions 210 connected to the electrode tabs.

Further, each electrode tap in the battery module 1000 may be made of different materials. In the battery module 1000 welded by the method for welding a battery module according to the exemplary embodiment of the present invention, some of the electrode tabs are made of copper and some of the electrode tabs are made of aluminum. Further, the voltage measurement portion 210 of the voltage measurement means 200 is made of a copper material having good electrical conductivity. In this case, the electrode tab made of the copper material is named the first electrode tab 110 and the electrode tab made of the aluminum material is named a second electrode tab 120.

Further, the battery module 1000 may have a serial form in which a negative electrode tab and a positive electrode tab which are adjacent to each other are welded to each other and a parallel form in which the adjacent electrode tabs having same polarity are welded to each other. The battery module 1000 welded by the method for welding a battery module according to the exemplary embodiment of the present invention has a serial form and the method for welding an electrode tab according to the exemplary embodiment of the present invention may be applied independent of the serial form and the parallel form and thus productivity of the battery module 1000 may be improved.

Figure 1:
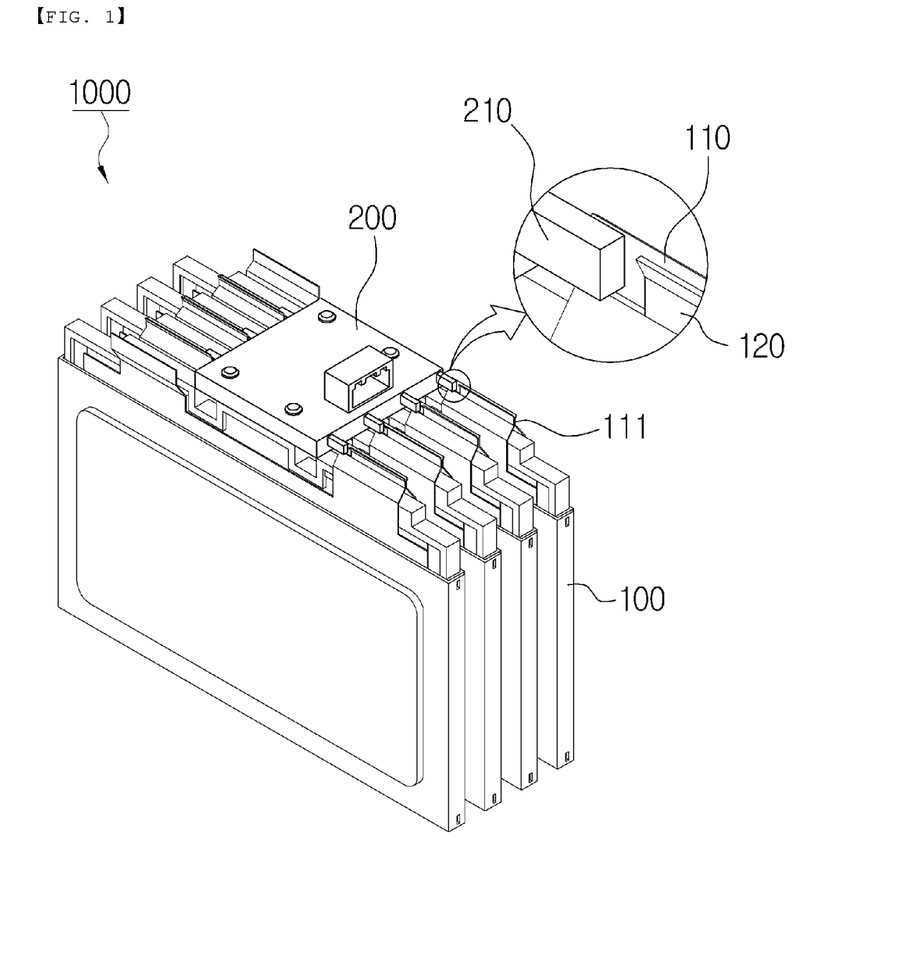
FIG. 1 is a perspective view of a battery module welded by a method for welding a battery module according to an exemplary embodiment of the present invention.
Figure 2:
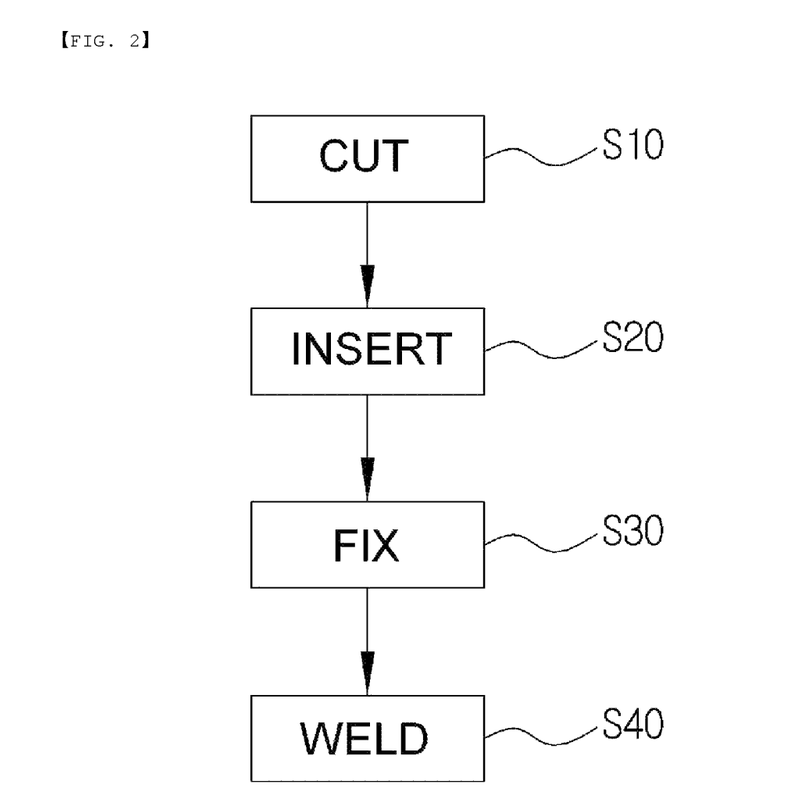
FIG. 2 is a flow chart of the method for a battery module according to the exemplary embodiment of the present invention.

FIG. 1 is a perspective view of the battery module 1000 welded by a method for welding a battery module according to an exemplary embodiment of the present invention and FIG. 2 is a flow chart of the method for welding a battery module according to the exemplary embodiment of the present invention. Hereinafter, the method for welding a battery module according to the exemplary embodiment of the present invention will be described in detail with reference to FIGS. 1 and 2.

The method for welding a battery module according to the exemplary embodiment of the present invention includes cutting (S10), inserting (S20), and welding (S40).

Figure 3:
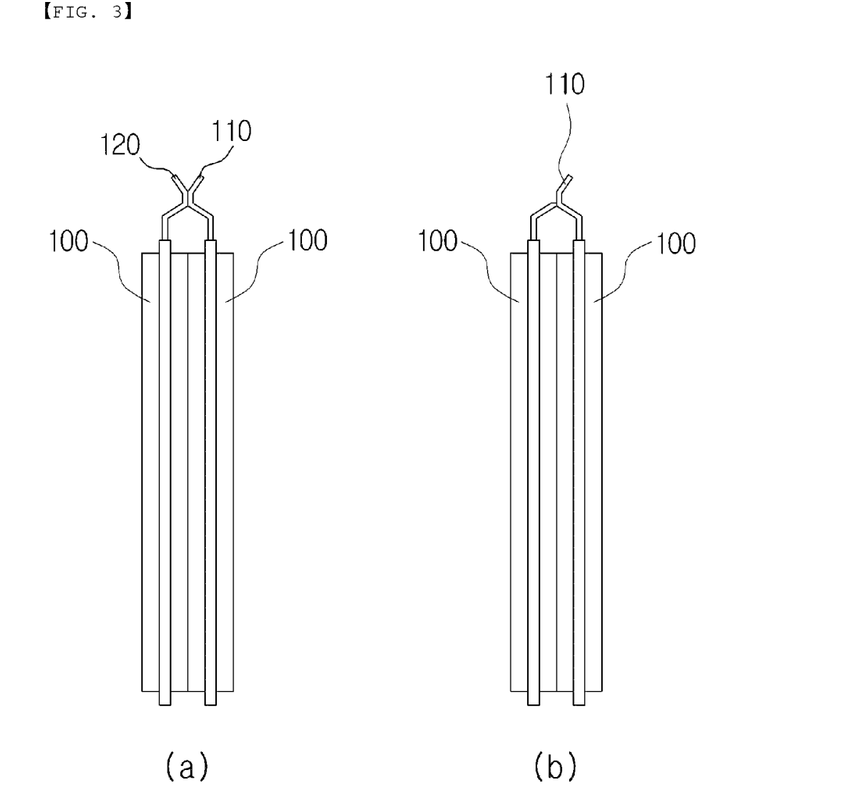
FIG. 3 is a front view illustrating cutting in the method for welding a battery module according to the exemplary embodiment of the present invention.

FIG. 3 is a front view illustrating cutting (S10) in the method for welding a battery module according to the exemplary embodiment of the present invention. The cutting (S10) of the method for welding a battery module according to the exemplary embodiment of the present invention will be described in detail with reference to FIG. 3.

The cutting (S10) is cutting some of the electrode tabs. When a plurality of battery cells 100 form the battery module 1000, the first electrode tab 110, the second electrode tab 120, and the voltage measurement portion 210 are welded to one another in order. In this case, a welding temperature of copper forming the first electrode tab 110 is approximately 1400° C. and a welding temperature of aluminum forming the second electrode tab 120 is approximately 800° C. When the welding is performed in order as described above, the welding is performed in order of copper, aluminum, and copper materials and therefore much time and costs are consumed to perform the welding. Therefore, the method for welding a battery module according to the exemplary embodiment of the present invention cuts and removes a portion of the second electrode tab 120 in the cutting (S10), thereby forming a space portion into which the voltage measurement portion 210 may be inserted. That is, the first electrode tab 110 and the voltage measurement portion 210 which are made of the same copper material may be welded to each other to reduce welding time and costs.

Further, the method for welding a battery module according to the exemplary embodiment of the present invention welds the voltage measurement portion 210 around the electrode tabs of the battery module 1000 to secure stability against vibrations and external shocks, thereby providing the battery module 1000 with improved reliability of a voltage measurement value.

Figure 4:
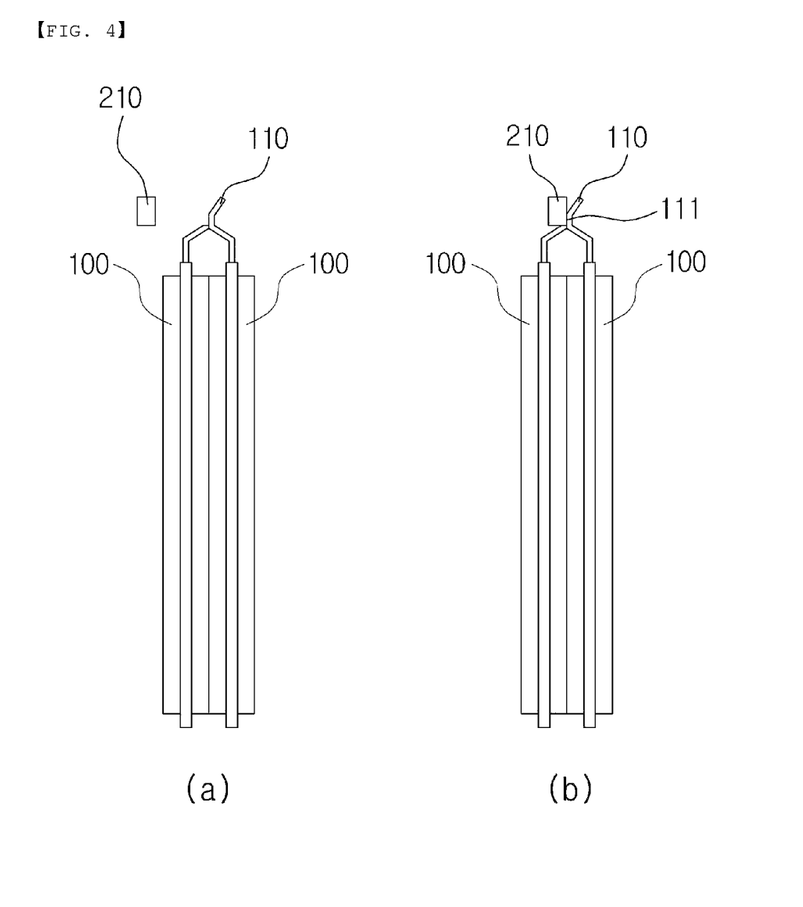
FIG. 4 is a front view illustrating inserting in the method for welding a battery module according to the exemplary embodiment of the present invention.

The method for welding a battery module according to the exemplary embodiment of the present invention performs the inserting (S20) after the cutting (S10). FIG. 4 is a front view illustrating the inserting (S20) of the method for welding a battery module according to the exemplary embodiment of the present invention, in which the cutting (S10) is performed and then the inserting (S20) is performed and the voltage measurement portion 210 is inserted into the space portion formed by removing a portion of the second electrode tab 120. Therefore, a welded surface 111 is formed by contacting the first electrode tap 110 and the voltage measurement portion 210 each other.

Figure 5:
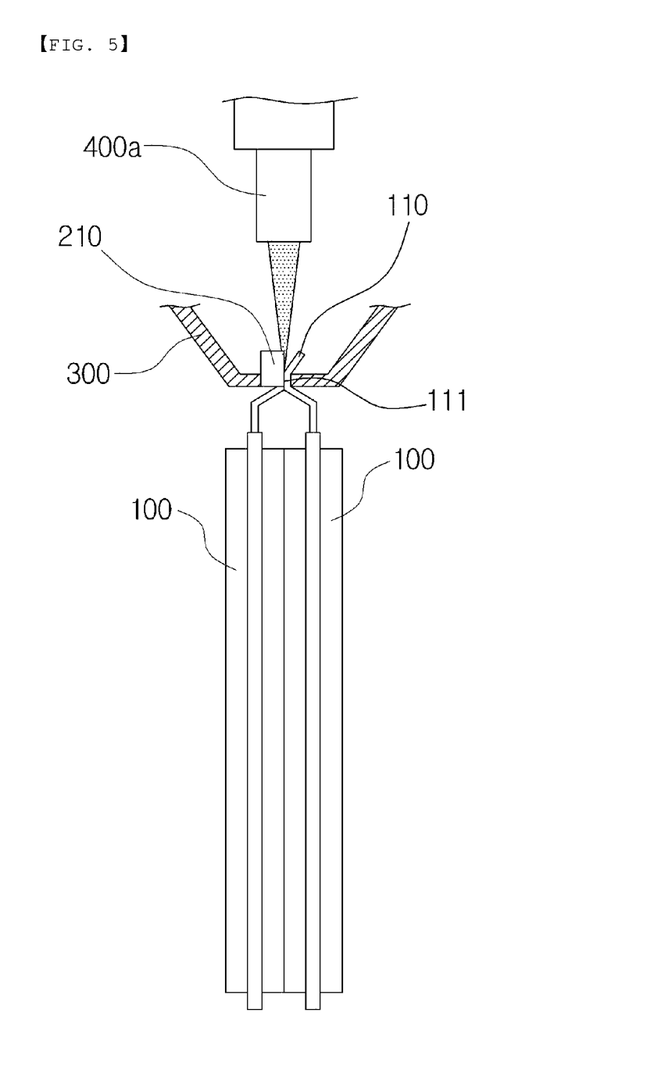
FIG. 5 is a front view illustrating welding in the method for welding a battery module according to the exemplary embodiment of the present invention.

The method for welding a battery module according to the exemplary embodiment of the present invention performs fixing (S30) the first electrode tab 110 and the voltage measurement portion 210 to both sides of the battery module 1000 and welding (S40) the welded surface 111 formed in the inserting (S20). FIG. 5 is a front view illustrating the welding (S40) in the method for welding a battery module according to the exemplary embodiment of the present invention. The welded surface 111 is welded in the state in which the fixing means 300 fixes the first electrode tab 110 and the voltage measurement portion 210. Therefore, the method for welding a battery module according to the exemplary embodiment of the present invention performs the fixing (S30) prior to the welding (S40) to stably perform the welding, thereby improving reliability of a product.

Further, in the welding (S40), the first electrode tap 110 and the voltage measurement portion 210 are welded by using a welding means 400a. In this case, as the welding means 400a, various welding means 400a such as ultrasonic welding may be used and the welding means 400a may be variously changed without departing from the object of the present invention.

Figure 6:
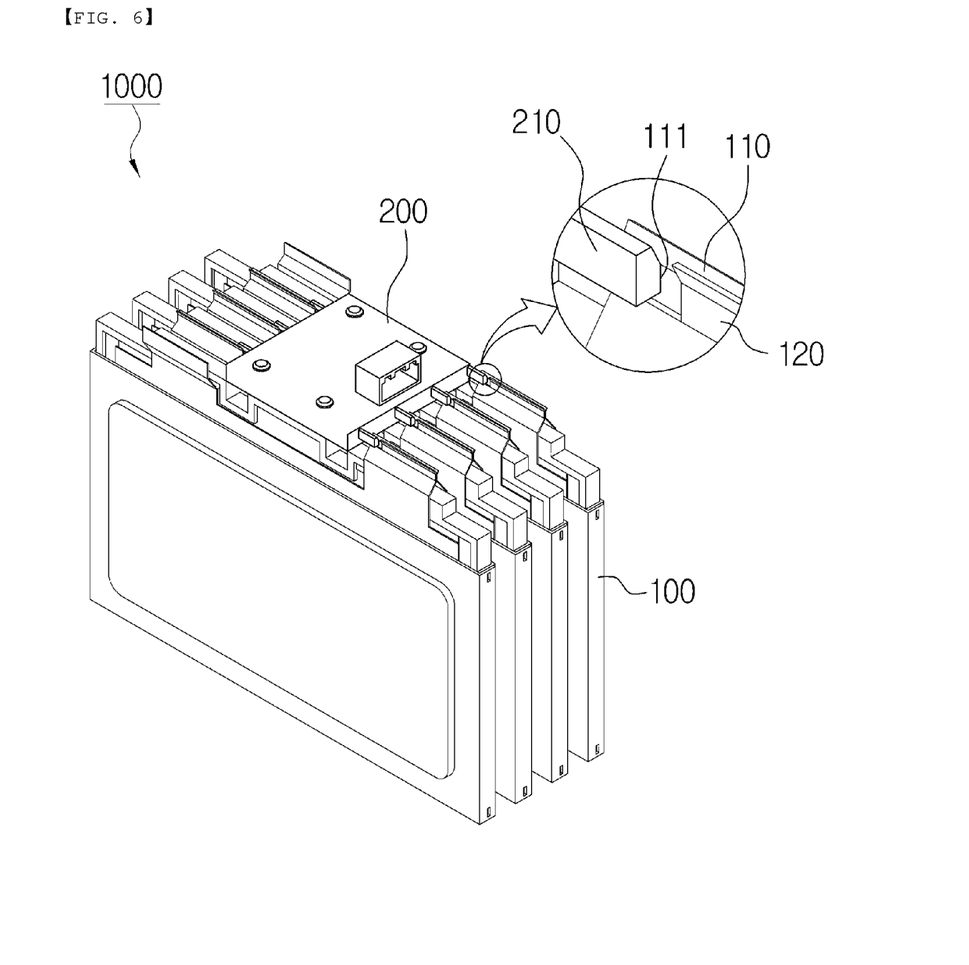
FIG. 6 is a perspective view illustrating a battery module welded by a method for welding a battery module according to another exemplary embodiment of the present invention.
Figure 7:
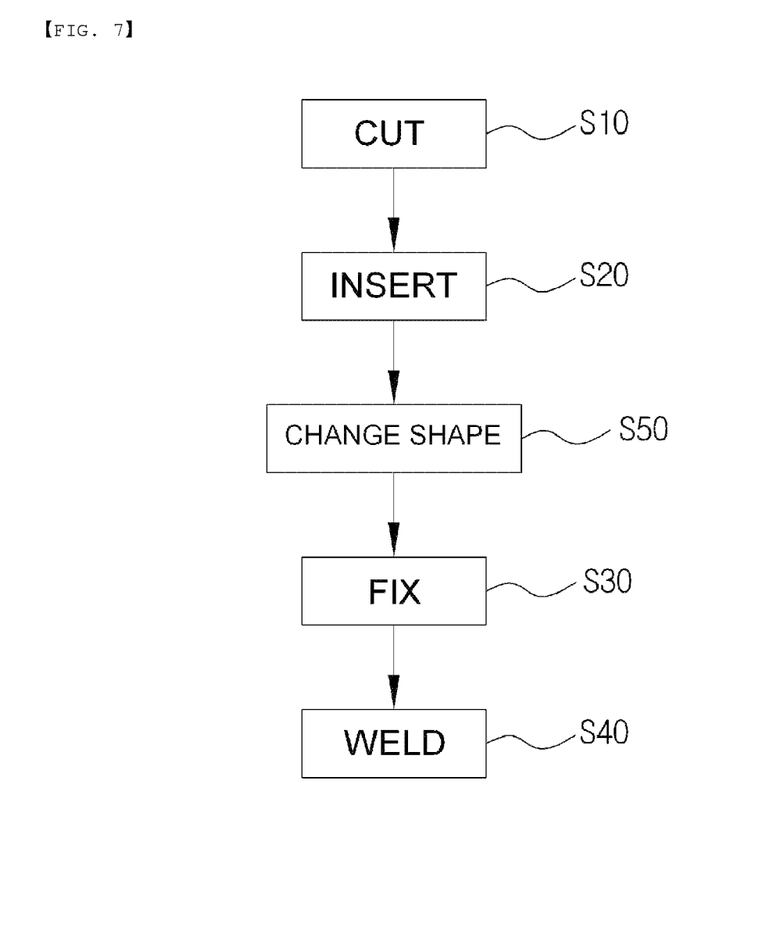
FIG. 7 is a flow chart of a method for welding a battery module according to another exemplary embodiment of the present invention.

FIG. 6 is a perspective view illustrating the battery module 1000 welded by a method for welding a battery module according to another exemplary embodiment of the present invention and FIG. 7 is a flow chart of a method for welding a battery module according to another exemplary embodiment of the present invention. Hereinafter, the method for welding a battery module according to another exemplary embodiment of the present invention will be described in detail with reference to FIGS. 6 and 7.

The method for welding a battery module according to another exemplary embodiment of the present invention is the same as the method for welding a battery module according to the exemplary embodiment of the present invention but further includes changing a shape (S50). Further, the method for welding a battery module according to another exemplary embodiment of the present invention is limited to only the case in which a laser welding is performed in the welding (S40).

Figure 8:
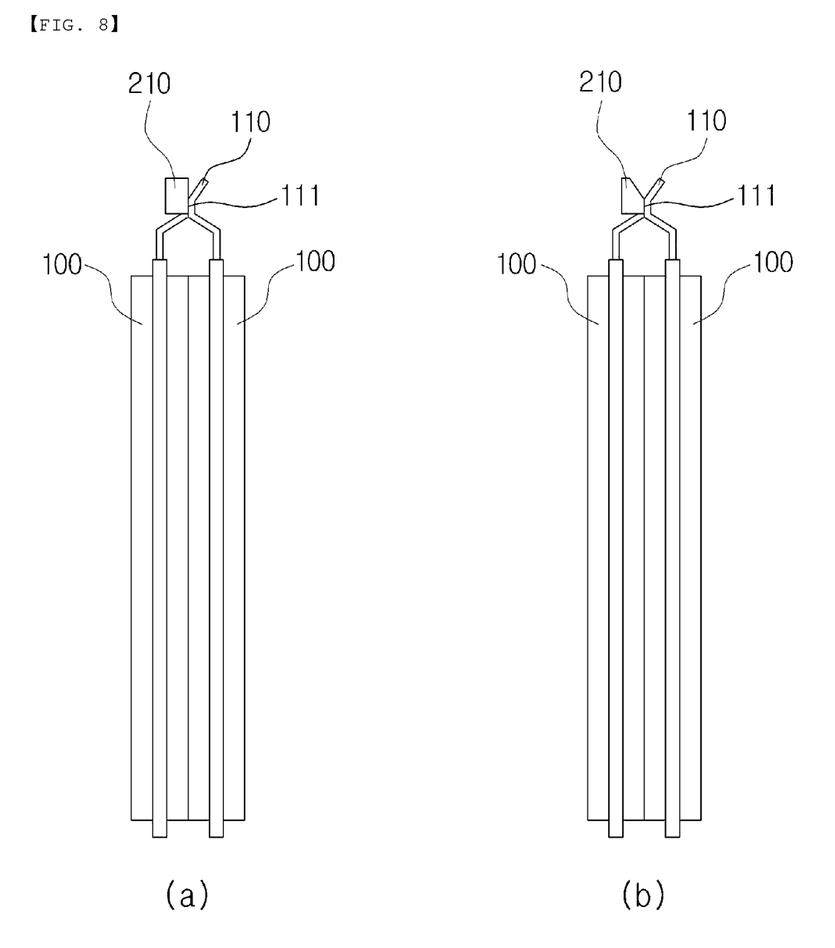
FIG. 8 is a front view illustrating changing a shape in the method for welding a battery module according to another exemplary embodiment of the present invention.

The method for welding a battery module according to another exemplary embodiment of the present invention further performs the changing of the shape (S50) after the inserting (S20). FIG. 8 is a front view illustrating the changing of the shape (S50) in the method for welding a battery module according to another exemplary embodiment of the present invention, in which in the changing of the shape (S50), the shape of the voltage measurement portion 210 inserted in the inserting (S20) is changed.

However, in the changing of the shape (S50) according to another exemplary embodiment of the present invention, after the shape of the voltage measurement portion 210 is changed prior to the inserting (S20), the voltage measurement portion 210 of which the shape of the upper portion is changed may also be inserted into the space portion formed by removing a portion of the second electrode tab 120.

In the change of the shape (S50), a portion of the voltage measurement portion 210 is cut and removed and thus is changed to the same shape as the bent shape of the second electrode tab 120. That is, the shape of the voltage measurement portion 210 is changed so that the surfaces of the first electrode tab 110 and the voltage measurement portion 210 have a Y-letter shape at an outer side of the welded surface 111.

Therefore, the first electrode tab 110 and the voltage measurement portion 210 which suffers from the change in the shape (S50) are changed to the same shape as the shape which is formed by the first electrode tab 110 and the second electrode tab 120, and therefore may be welded together at the time of welding the first electrode tab 110 and the second electrode tab 120. That is, the welding between the first electrode tab 110 and the second electrode tab 120 and the welding between the first electrode tab 110 and the voltage measurement portion 210 are not separately performed but may be performed at a time, and therefore the welding time may be reduced and the reliability of a product may also be increased.

Figure 9:
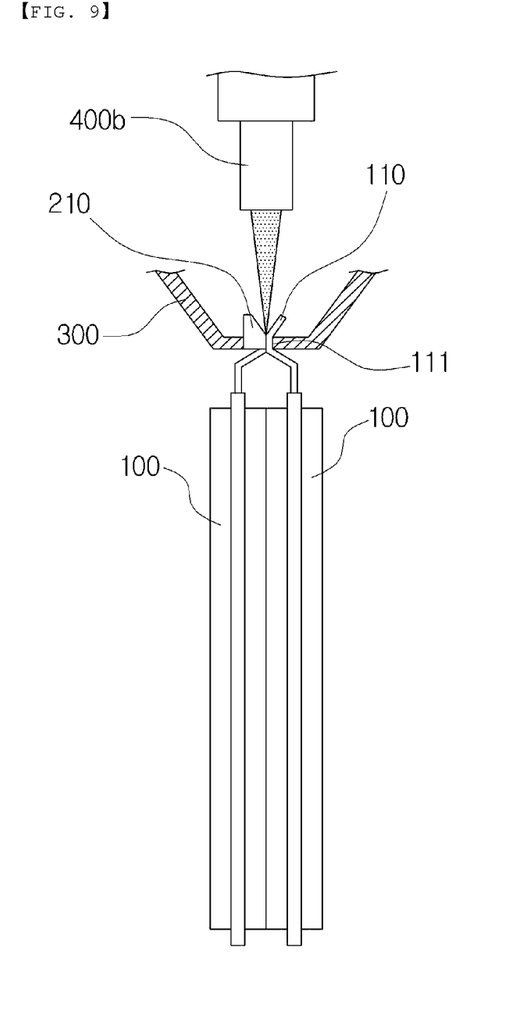
FIG. 9 is a front view illustrating welding in the method for welding a battery module according to another exemplary embodiment of the present invention.

FIG. 9 is a front view illustrating the welding in the method for welding a battery module according to another exemplary embodiment of the present invention. The method for welding a battery module according to another exemplary embodiment of the present invention performs the welding by irradiating a laser to the welded surface 111 by a laser welding means 400b as a welding means 400b.

The present invention should not be construed to being limited to the above-mentioned exemplary embodiment. The present invention may be applied to various fields and may be variously modified by those skilled in the art without departing from the gist of the present invention claimed in the claims. Therefore, it is obvious to those skilled in the art that these alterations and modifications fall in the scope of the present invention.

DESCRIPTION OF REFERENCE NUMERALS

1000: Battery module
100: Battery cell
110: First electrode tab
120: Second electrode tab
111: Welded surface
200: Voltage measurement means
210: Voltage measurement potion
300: Fixing means
400a, 400b: Welding means
S10~S50: Each process of method for welding battery module according to the present invention

The invention claimed is:
1. A battery module comprising:
a plurality of battery cells, each battery cell having first and second electrode tabs made of different materials; and
a voltage measurement means provided with a plurality of voltage measurement portions made of the same material as the first electrode tab, wherein the first and second electrode tabs are welded at a welded surface formed by contacting each other and the voltage measurement portion is welded with the first electrode tab exposed in a space portion, which is formed by cutting some portion of the second electrode tab, wherein:

the first electrode tab includes a first contact portion and a first bent portion which is bent at an end of the first contact portion;

the second electrode tab includes a second contact portion and a second bent portion which is bent at an end of the second contact portion;

the first contact portion and the second contact portion contact each other to form a welded surface;

the first bent portion and the second bent portion are bent in opposite directions to each other; and the voltage measurement portion has a same shape as the bent shape of the second electrode tab when the laser welding is performed.

* * * * *